United States Patent [19]
Mette

[11] Patent Number: 4,796,523
[45] Date of Patent: Jan. 10, 1989

[54] INSTALLATION FOR THE CONTINUOUS HEAT TREATMENT OF FOODSTUFFS

[75] Inventor: Manfred Mette, Hamburg, Fed. Rep. of Germany

[73] Assignee: Nordischer Maschinenbau Rud. Baader GmbH + Co, Lubeck, Fed. Rep. of Germany

[21] Appl. No.: 27,639

[22] Filed: Mar. 19, 1987

[30] Foreign Application Priority Data

Mar. 26, 1986 [DE] Fed. Rep. of Germany ....... 3610124

[51] Int. Cl.⁴ ............................ A23L 3/00; A23L 3/18
[52] U.S. Cl. .................................. 99/470; 99/443 C; 99/477; 99/483; 99/516
[58] Field of Search ................. 99/483, 470, 516, 536, 99/443 C, 361, 362, 366, 371, 477–479, 534; 422/297, 302, 304; 426/520, 523, 315

[56] References Cited
U.S. PATENT DOCUMENTS

| | | | |
|---|---|---|---|
| 3,868,897 | 3/1975 | Moreau | 99/483 |
| 4,204,006 | 5/1980 | Emgard et al. | 99/443 C |
| 4,358,993 | 11/1982 | Spillman et al. | 99/483 |
| 4,385,035 | 5/1983 | Akitoshi et al. | 422/297 |
| 4,548,130 | 10/1985 | Diener et al. | 99/443 C |
| 4,644,857 | 2/1987 | Buller-Colthurst | 99/335 |
| 4,685,386 | 8/1987 | Bezon | 99/443 C |

Primary Examiner—Timothy F. Simone
Attorney, Agent, or Firm—Thomas R. Morrison

[57] ABSTRACT

In an installation for the continuous heat treatment of foodstuffs, it is suggested to subdivide the installation through the use of a series of separate containers for receiving an aqueous heat carrier, the sections formed by these separate containers being traversed successively by a conveyor for the material to be processed. These containers can be connected with each other in a variable manner with regard to the fluid conduction. The thus variable through-flow system makes it possible to take account in an optimum manner of the product-related nutrition-physiological and sensory requirements, while simultaneously the operating costs of the process can be minimized.

12 Claims, 4 Drawing Sheets

INSTALLATION FOR THE CONTINUOUS HEAT TREATMENT OF FOODSTUFFS

BACKGROUND OF THE INVENTION

1. Field of the Invention

The invention relates to an installation for the continuous heat treatment of foodstuff material under atmospheric pressure for finishing and/or dewatering said material through contact with a liquid heat carrier, preferably water, the installation comprising a housing having an inlet and an outlet for the material to be treated and including a series of treatment zones; an endless conveyor driven to revolve and traversing the treatment zones successively for conveying the material to be treated through the treatment zones; means for supplying and removing the heat carrier and for conveying the same within the installation; and heat exchange means for controlling the enthalpy (heat content) of the heat carrier.

2. Prior Art

Such installations are used in the industrial preparation of foodstuffs by heat treatment. For example, they are used for finishing all types of cooked sausage, vacuum packed sausage, collectively blister-packed sausage, take-away meals in sealed plastic containers, fish products and the like products, or also for blanching all types of cabbage and bulb and tuber vegetables.

The temperature control is of decisive influence on the economical operation of such installations, which influence is also of preeminent importance with respect to maintaining the quality of the material to be treated, particularly as punctiform overheating of the material to be treated has a serious quality-reducing effect thereon. Therefore, particular attention has been paid to the temperature control and distribution, and it has been taken care that a temperature as uniform and as precisely controlled as possible prevails throughout the water bath.

This procedure is disadvantageous in many respects. Thus, in finishing processes, it is in most cases desired to obtain a homogeneous temperature distribution in the material to be finished, so that the temperature acting on all parts of the cross-section does not significantly differ from the temperature found to be favourable, e.g. in nutrition-physiological and sensory respect. However, for supposed economical reasons, a much higher temperature than this is normally used with the aim of obtaining the desired core temperature more rapidly, i.e. to achieve a higher throughput due to shorter transit times. However, this is linked with the risk of the material being finished being overheated in its marginal zones before the core temperature has reached the desired value. Apart from the quality reduction mentioned in this connection, this handling, particularly in the case of sensitive packing casings, e.g. sausages with casings made from predetermined intestine qualities, leads to a higher splitting rate during the heat treatment as a result of the increased tensions which, consequently, occur in the product. In addition, the energy balance is not favourable, inter alia due to the heat losses which increase exponentially with the temperature.

3. Objects of the Invention

It is therefore an essential object of the present invention to suggest an installation or apparatus for finishing and/or dewatering foodstuffs by a continuous heat treatment, which allows such treatment whilst taking optimum care of the nutrition-physiological and sensory requirements. It is a further important object of the invention to perform such treatment at minimum operational costs. It is yet another major object of the invention to adapt the operational conditions simultaneously and in a universal manner to the requirements and particularities of the respective material which is to be treated, i.e. to varying conditions and compositions of such material to be processed.

SUMMARY OF THE INVENTION

In an installation comprising a housing having an inlet and an outlet for the material to be treated and including a series of treatment zones; an endless conveyor driven to revolve and traversing the treatment zones successively for conveying the material to be treated through the treatment zones; means for supplying and removing the heat carrier and for conveying the same within the installation; and heat exchange means for controlling the enthalpy (heat content) of the heat carrier, these objects are achieved in that a series of containers is arranged separately from each other and each adapted to receive the heat carrier, that the means for supplying and removing the heat carrier are associated with the containers separately and in a manner to be controlled independently, and that the containers have connecting lines adapted to be connected variably to one another for a variable exchange of the heat carrier within the installation.

The resulting advantages of such an arrangement particularly reside in broadening the applicability of such installation in so far as any treatment process of the types outlined above can be performed within the same installation, and it becomes possible to use the heat exchange means in a variable manner, by way of such means for supplying the necessary thermal energy as well as such for possibly removing the same. This, among other advantages, enables to obtain favourable operating costs and to optimize the same.

According to an advantageous embodiment of the invention, the means for supplying the heat carrier may be designed as sprinklers or showers, at least one each of them being associated with an outlet region of each container, while the means for removing the heat carrier may be designed as feed pumps, one each of which being associated with the inlet region of each container.

For promoting the variability of the installation, a preferred embodiment provides that the feed pumps be controllable with regard to their yield/capacity, whereas the conveyor for the material to be treated should be controllable with respect to its conveying speed.

In accordance with another expedient embodiment, the installation, according to the present invention, may comprise a device for discharging solids which should be associated with the inlet region of each container.

The high degree of variability of the installation according to the invention results in several expedient constellations of arrangements, so that the apparatus according to the invention may, in a first form of realization, comprise a preheating zone and a precooling zone which are associated or combined with each other to form a heat recovery circuit, a multi-stage boiling zone, and a final cooling zone. In a second arrangement or combination, the apparatus may comprise an extended multi-stage boiling zone and a multi-stage cooling zone, while in a third arrangement, it can comprise a preheating zone and a cooling zone which are coupled in a manner to form a heat recovery circuit, as well as an extended multi-stage boiling zone. Furthermore, the combinatory arrangement in a fourth form of realization may be such that the apparatus merely comprises a multi-stage boiling zone. In all of these variants of combination and/or connection arrangement, the conduction of the heat carrier should occur in a direction counter to the conveying direction of the conveyor for the material to be treated, so that the apparatus, in each case, works according to the countercurrent principle.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
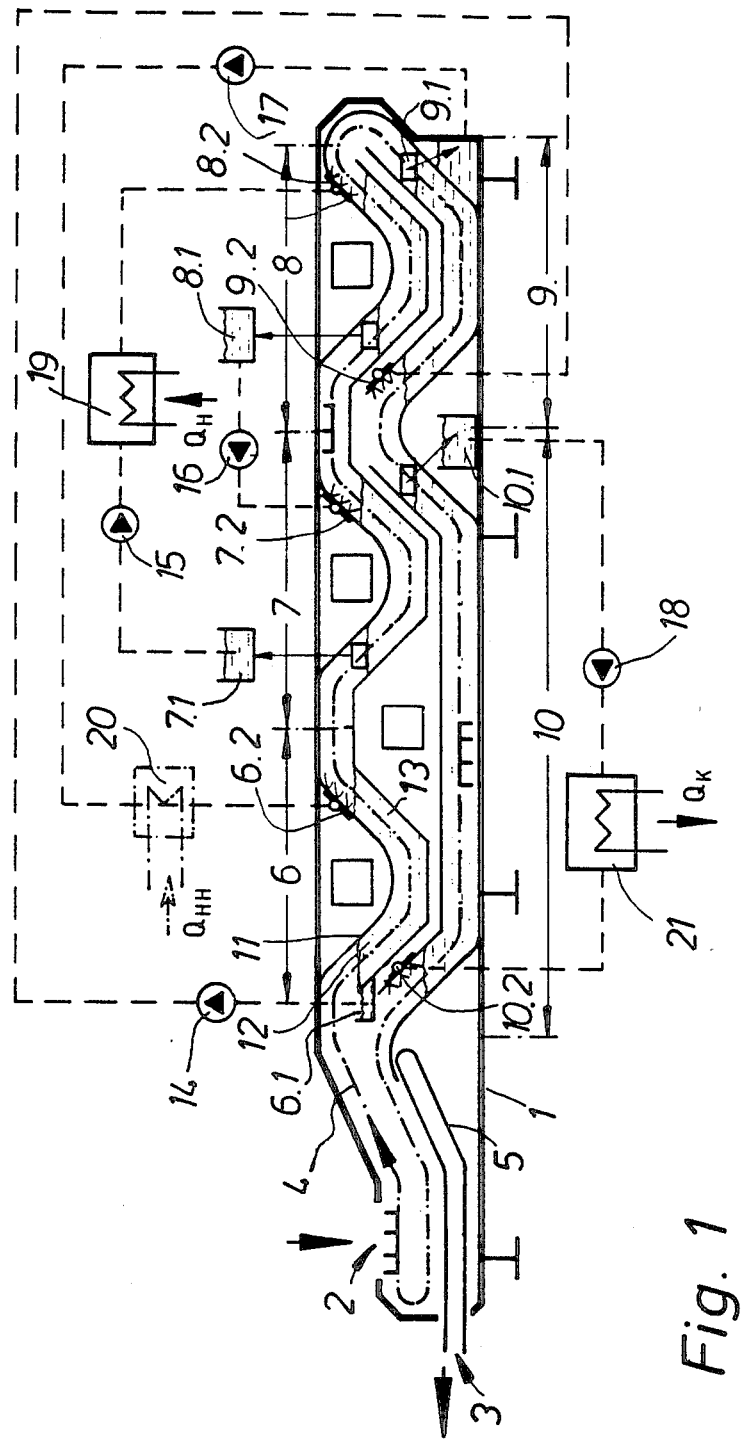
FIG. 1 shows a cooking installation in accordance with the present invention with a basic construction in an example of connection for obtaining a preheating and precooling zone coupled to form a heat recovery circuit, a multi-stage boiling zone and a final cooling zone.

As shown in FIG. 1, the installation as a whole is surrounded by a suitably designed casing 1, which has an inlet zone 2 for the material to be treated and an outlet zone 3 for the discharge thereof. A continuously (endlessly) revolving conveyor 4, driven in a conveying direction by an appropriate variable-speed drive, is provided for taking over the material to be treated. The conveyor passes through the whole installation and, on its way, is guided in the necessary manner by suitable reversing means. The conveyor 4 is provided with not shown reception elements for the material to be treated in the form of seesaw-like, perforated buckets or baskets, which are attached to the conveyor 4 at regular intervals. A discharge conveyor 5 constituted by a perforated conveyor belt is associated with the outlet zone 3, above which belt is arranged a not shown reversing station for the overhead guidance of the baskets and, therefore, for transferring the finished product to the discharge conveyor 5. Drawn-in metal sheets with a trough-like configuration subdivide the casing 1 into containers 6 to 10 for receiving the heat carrier and which provide a series of separate treatment zones. The arrangement of the containers 6 to 10 and, therefore, the treatment zone is performed in a stage-like manner, so that a construction with relatively limited space requirements is obtained. Convex displacement plates 11 subdivide the containers into two communicating container parts 12, 13, respectively, which are traversed successively by the conveyor 4. An overflow 6.1 to 10.1 determining the maximum heat carrier level is associated with the inlet region of each container 6 to 10, whilst a sprinkler or shower 6.2 to 10.2 is associated with the outlet region of each container. Each of the overflows 6.1 to 10.1 is provided with a collecting vessel, into which issues the suction pipe of one feed pump 14 to 18 each. The respective pressure pipes thereof can be connected selectively to the sprinklers 6.2 to 10.2.

The operation of the apparatus will firstly be described in context with the FIG. 1 connection arrangement:

After the containers 6 to 10 have been filled by means of suitable intakes with water acting as the heat carrier, the feed pump 15 is put into operation and supplies water from the container 7 to the container 8 via a heat exchanger 19 located in the pressure pipe thereof, which step is accompanied by heating. Simultaneously, the feed pump 16 is put into operation and supplies the water passing into the overflow 8.1 to the sprinkler 7.2, so that there is a circulation or circuit between the containers 7 and 8. As soon as the set water temperature is reached, the conveyor 4, as well as the feed pumps 14, 17 and 18 are started, so that the material to be treated is passed into the installation and, with respect to the running direction of the conveyor 4, the heat carrier circulates in countercurrent manner in all the containers. In order to make it possible to put the installation into operation under conditions at least approximately corresponding to those occurring in operation, the water supplied to the container 6 can be preheated by means of an auxiliary heat exchanger 20, so that the temperature of the water in said container, as well as in the container 9 coupled therewith is raised. Thus, the material to be treated is initially preheated in the container 6 and passes into the actual boiling zone with a correspondingly raised temperature, which, in this case, is represented by the containers 7 and 8. Recooling commences in the container 9, which effects that part of the thermal energy inherent in the material to be treated is transferred to the heat carrier present therein, so that its enthalpy can be used for preheating the following material to be treated as a result of the transfer thereof into the container 6. It is transferred from the container 9 into the container 10, where it is recooled to the desired end temperature, which, if necessary, is adjusted by cooling via a heat exchanger 21 by means of the heat carrier present therein.

Figure 2:
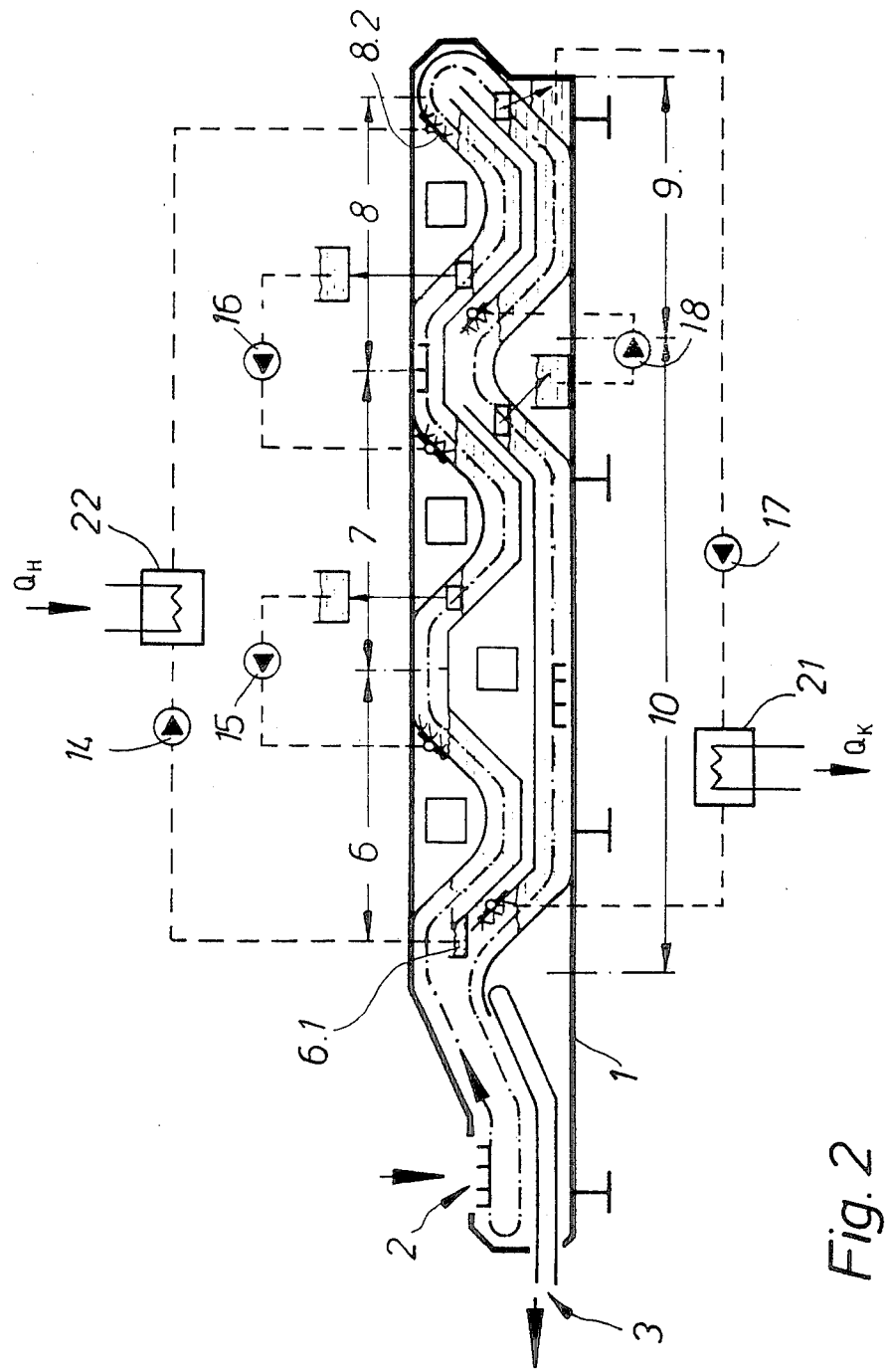
FIG. 2 shows a variant of connection of a boiling installation in accordance with the present invention by which an extended multi-stage boiling zone and a multi-stage cooling zone are obtained.

In the example of FIG. 2, a connection of the installation is provided which merely comprises a boiling zone and a cooling zone. This is achieved in that the feed pump 14 connected to the overflow 6.1 is connected to the sprinkler 8.2, and the feeding pumps 15 and 16 are used as connecting conveyors between the containers 6, 7, as well as 7, 8. A heat exchanger 22 is arranged in and connected to the circuit of the feed pump 14 for heating the heat carrier. The cooling zone extends across the containers 9, 10 connected by the feed pump 18 and whose heat carrier can, if required, be recooled via the heat exchanger 21 during the circulation effected by the feed pump 17.

Figure 3:
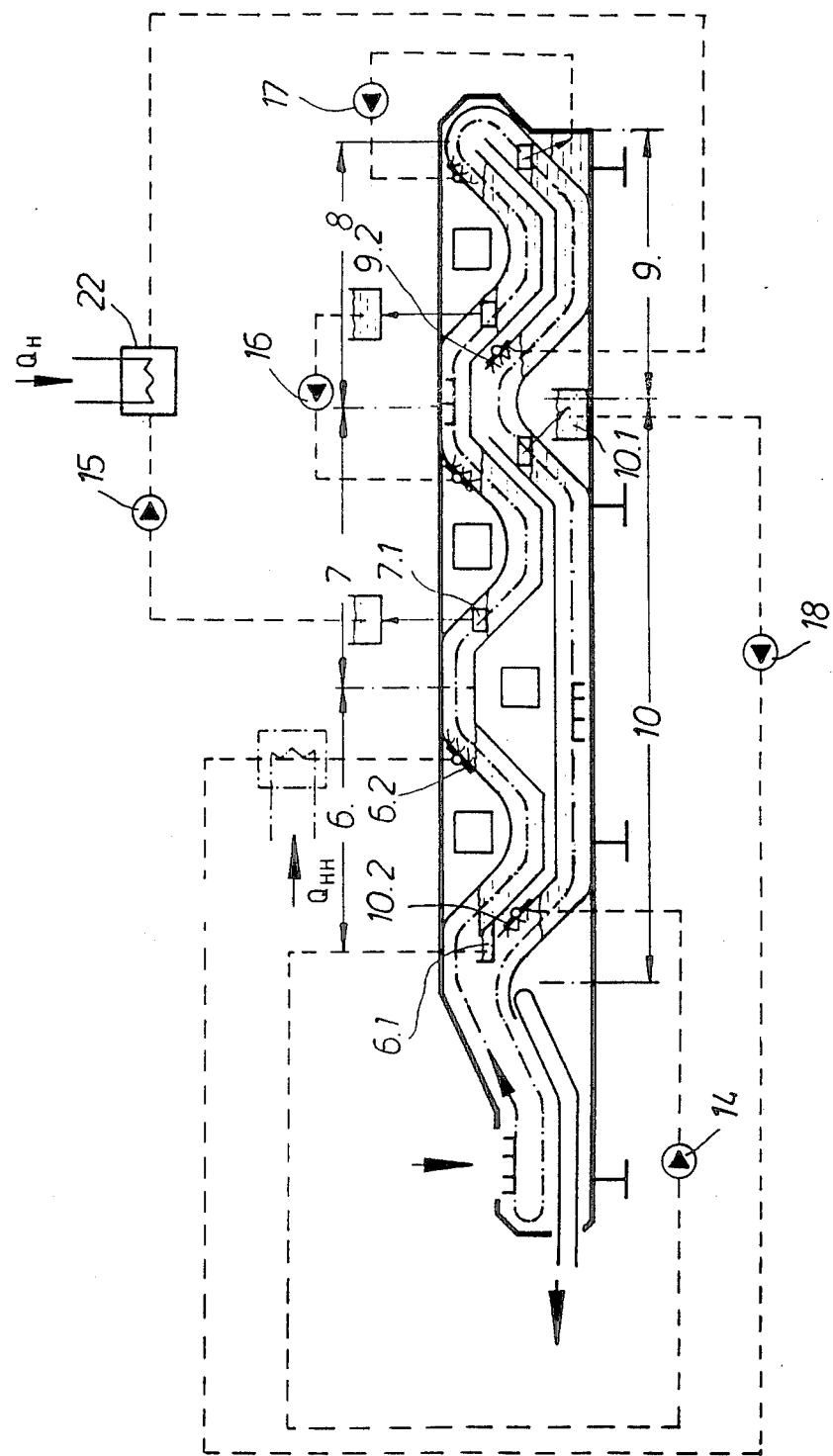
FIG. 3 shows a variant of connection of a boiling installation in accordance with the present invention by which a preheating zone and a cooling zone are coupled to form a heat recovery circuit and an extended boiling zone is obtained.

According to FIG. 3, the boiling zone extends across the containers 7, 8 and 9 due to the fact that the feed pump 15 connects the overflow 7.1 via the heat exchanger 22 to the sprinkler 9.2 and the feed pumps 16, 17 serve as connecting conveyors between the containers 7, 8 as well as 8, 9. In addition, the overflow 10.1 is connected via the feed pump 19 to the sprinkler 6.2, while the overflow 6.1 is connected to the sprinkler 10.2 by means of the feed pump 14. This leads to a heat recovery circuit, which passes to the container 6 the thermal energy transferred from the heated material to be treated to the heat carrier in the container 10 and consequently makes this treatment zone the preheating zone.

Figure 4:
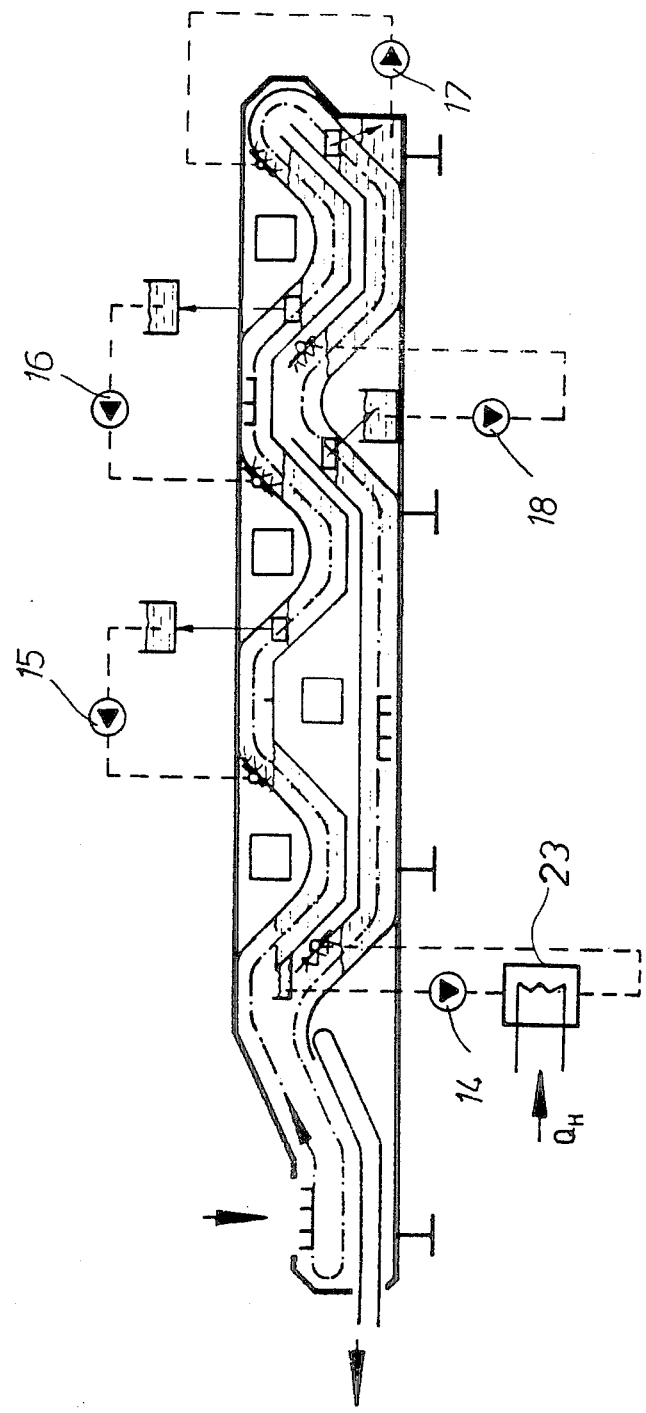
FIG. 4 shows a variant of connection of a boiling installation in accordance with the present invention only resulting in an elongated boiling zone.

Finally, FIG. 4 shows a pure boiling installation, in which the heat carrier heated by a heat exchanger 23 is pumped successively through all the containers 10 to 6.

What is claimed is:

1. An installation for the continuous heat treatment of foodstuff material under atmospheric pressure for at least one of finishing and dewatering said material through contact with a liquid heat carrier, said installation comprising:

a housing having inlet and outlet means for said material to be treated and including a series of treatment zones;

endless conveyor means driven to traverse said treatment zones successively in a conveying direction for conveying said material to be treated through said treatment zones;

means for supplying and removing said heat carrier and for conveying the same within said installation;

heat exchange means for controlling an enthalpy of said heat carrier;

a series of containers arranged separately from each other and to receive said heat carrier, respectively; and said means for supplying and removing said heat carrier including means for permitting said supplying and removing to be controlled independently between said containers for a variable exchange of said heat carrier within said installation.

2. An installation as claimed in claim 1, wherein each of said containers has an inlet and an outlet region, respectively; said means for supplying said heat carrier are designed as sprinklers associated with said outlet region of each of said containers, respectively; and said means for removing said heat carrier are designed as feed pumps associated with said inlet region of each of said containers, respectively.

3. An installation as claimed in claim 2, wherein said feed pumps are arranged to be controlled with regard to their throughput, and said conveyor means for conveying said material to be treated are arranged to be controlled with regard to the conveying speed.

4. An installation as claimed in claim 1, wherein said installation comprises means for discharging solids, which means are associated with each one of said containers.

5. An installation as claimed in claim 2, wherein said installation comprises means for discharging solids, which means are associated with said inlet region of each one of said containers.

6. An installation as claimed in claim 3, wherein said installation comprises means for discharging solids, which means are associated with said inlet region of each one of said containers.

7. An installation as claimed in claim 1, wherein said containers are connected in a manner to form an installation comprising one of the following connection arrangements a preheating zone and precooling zone coupled together to form a heat recovery circuit; a multistage boiling zone: and a final cooling zone;

an extended multi-stage boiling zone and a multistage cooling zone;

a preheating zone and a cooling zone both coupled in a manner to form a heat recovery circuit; and an extended multi-stage boiling zone;

merely a multi-stage boiling zone;

the conduction of said heat carrier taking place against said conveying direction of said conveyor moving said material to be treated, i.e. according to the countercurrent principle.

8. An installation as claimed in claim 2, wherein said containers are connected in a manner to form an installation comprising one of the following connection arrangements a preheating zone and precooling zone coupled together to form a heat recovery circuit; a multistage boiling zone; and a final cooling zone;

an extended multi-stage boiling zone and a multistage cooling zone;

a preheating zone and a cooling zone both coupled in a manner to form a heat recovery circuit; and an extended multi-stage boiling zone;

merely a multi-stage boiling zone;

the conduction of said heat carrier taking place against said conveying direction of said conveyor moving said material to be treated, i.e. according to the countercurrent principle.

9. An installation as claimed in claim 3, wherein said containers are connected in a manner to form an installation comprising one of the following connection arrangements a preheating zone and precooling zone coupled together to form a heat recovery circuit; a multistage boiling zone; and a final cooling zone;

an extended multi-stage boiling zone and a multistage cooling zone;

a preheating zone and a cooling zone both coupled in a manner to form a heat recovery circuit; and an extended multi-stage boiling zone;

merely a multi-stage boiling zone;

the conduction of said heat carrier taking place against said conveying direction of said conveyor moving said material to be treated, i.e. according to the countercurrent principle.

10. An installation as claimed in claim 4, wherein said containers are connected in a manner to form an installation comprising one of the following connection arrangements a preheating zone and precooling zone coupled together to form a heat recovery circuit; a multistage boiling zone; and a final cooling zone;

an extended multi-stage boiling zone and a multistage cooling zone;

a preheating zone and a cooling zone both coupled a manner to form a heat recovery circuit; and an extended multi-stage boiling zone;

merely a multi-stage boiling zone;

the conduction of said heat carrier taking place against said conveying direction of said conveyor moving said material to be treated, i.e. according to the countercurrent principle.

11. An installation as claimed in claim 5, wherein said containers are connected in a manner to form an installation comprising one of the following connection arrangements a preheating zone and precooling zone coupled together to form a heat recovery circuit; a multi-stage boiling zone; and a final cooling zone;

an extended multi-stage boiling zone and a multi-stage cooling zone;

a preheating zone and a cooling zone both coupled in a manner to form a heat recovery circuit; and an extended multi-stage boiling zone;

merely a multi-stage boiling zone;

the conduction of said heat carrier taking place against said conveying direction of said conveyor moving said material to be treated, i.e. according to the countercurrent principle.

12. An installation as claimed in claim 6, wherein said containers are connected in a manner to form an installation comprising one of the following connection arrangements a preheating zone and precooling zone coupled together to form a heat recovery circuit; a multi-stage boiling zone; and a final cooling zone;

an extended multi-stage boiling zone and a multi-stage cooling zone;

a preheating zone and a cooling zone both coupled in a manner to form a heat recovery circuit; and an extended multi-stage boiling zone;

merely a multi-stage boiling zone;

the conduction of said heat carrier taking place against said conveying direction of said conveyor moving said material to be treated, i.e. according to the countercurrent principle.

* * * * *